May 6, 1969  I. E. DENTON  3,442,762

CERAMIC FUEL MATERIALS

Filed June 12, 1967

United States Patent Office 3,442,762
Patented May 6, 1969

3,442,762
CERAMIC FUEL MATERIALS
Ivor Edison Denton, Wantage, England, assignor to United Kingdom Atomic Energy Authority, London, England
Filed June 12, 1967, Ser. No. 645,108
Claims priority, application Great Britain, June 21, 1966, 27,674/66
Int. Cl. G21c 3/26
U.S. Cl. 176—69         5 Claims

ABSTRACT OF THE DISCLOSURE

A nuclear fuel of the dispersed type is characterised by fuel particles each coated with porous beryllia located in a preferably slip-cast, matrix and can of beryllia of nearly theoretical density.

Background of the invention

The present invention relates to ceramic fuel materials and is particularly concerned with the manufacture of dispersed fuels desirably but not necessarily of the oxide type.

It has been proposed to use fissile ceramic materials as the fuel in nuclear reactors, the materials proposed including the oxides of uranium and plutonium and mixtures thereof, and also the corresponding carbides. For use in reactors working at comparatively low temperatures, for example below about 600° C., the fuel may be sheathed in a metal can made, for example, of stainless steel or a zirconium alloy. These materials are not suitable for use in reactors operating with gas temperatures in excess of about 750° C., but in such reactors the fuel material could be contained within a ceramic material which has a high melting point, i.e. in excess of about 2,000° C. In the high temperatures gas cooled reactor experiment known as Dragon the designed operating temperature, i.e. fuel surface temperature, is in the region of 1,000° C. and a proposed fuel for this reactor comprises spheres of uranium carbide coated with pyrolytic carbon and dispersed in a graphite matrix.

It is preferred that the fissile material should occur in discrete particles within the matrix rather than being distributed uniformly through the matrix, since it is considered that this gives improved retention of fission products. It is also desirable that the overall bulk density of an oxide based dispersed fuel should be as high as possible, since this also gives improved fission product retention. In carbide fuels, however, the fission product retention is achieved by the use of the coating of pyrolytic carbon, the graphite matrix material merely acting to hold the particles together and the density of the matrix material having little effect on the fission product retention.

It is an object of the present invention to provide a new or improved dispersed ceramic fuel material and a method of manufacturing the same.

Summary of the invention

According to the present invention a method of manufacturing a dispersed ceramic fuel material comprises the steps of taking particles of a ceramic fuel material; coating such particles with a layer of beryllia; forming an unsintered can of beryllia; loading such coated particles into said can; filling the interstices between said coated particles with, and also forming end closures of, beryllia; and sintering said beryllia, whereby a continuous sintered beryllia matrix and can is formed to enclose said fuel particles.

According to a further aspect of the present invention, there is provided a fuel element for nuclear reactor comprising a plurality of particles of ceramic fuel material each coated with a layer of beryllia and contained within a sintered body of beryllia forming a continuous matrix between said particles and an un-fuelled outer layer or can.

As is known in the art, several coatings may be applied to the fuel particles. However, the outer coating in each case is beryllia which also forms the matrix. Very desirably the coating is sintered prior to loading the coated particles into the can and this sintering is effected under such conditions that the beryllia coating is appreciably porous thereby to accommodate swelling of the fissile material during irradiation. On the other hand, the matrix and can materials are desirably so chosen and sintered as to obtain as dense a result as possible, preferably over 98% thereby to form in effect around each particle and around the fuel as a whole a dense impermeable beryllia skin which will prevent the escape of fission products.

It will be apparent that, unless several coatings are applied to the fuel particles, the fuel material and the beryllia must be chemically compatible and it is preferred to use oxides as the fuel material although it is also possible to use carbides or nitrides. Thus the fuel material is desirably a fissile or fertile oxide, for example uranium, plutonium or thorium oxide or mixtures thereof.

Conveniently the fuel particles should be relatively large and are desirably spheres of diameter 150–250 microns, so as to reduce fission product damage to the coating.

The coating material should be in the form of a relatively fine powder for example sieved to give agglomerates of less than 200 mesh BSS, i.e. less than 76 microns. These agglomerates may consist of particles of size about 1 micron and may break down in the subsequent mixing with the fuel particles. The coating powder is conveniently mixed with wax prior to coating the fuel particles. The mixing with wax may be accomplished by any of the known methods and it is presently preferred to mix the powder with petroleum ether or other solvent containing dissolved wax and subsequently to allow the solvent to evaporate off. The fuel particles may be mixed with the waxed ceramic powder by tumbling in a rotating drum which, if necessary, may be heated, for example by means of an infra-red lamp.

The coated particles may be dewaxed by heating gently to a temperature of about 250° C.–300° C. in a vacuum furnace. They may then be sintered, for example at 1300° C., to give a porous coating, e.g. less than 50% theoretical density.

It is convenient to form the unfuelled can by slip casting and the same technique can be used to fill the interstices between the coated particles. In order to obtain a dense product it is convenient to make the slip from a beryllia powder having a continuous particle size distribution with substantially all particles less than three microns.

Of the powders used, we have found that satisfactory results may be obtained when the particle size distribution curve has a peak within a particle size range of 9.6 to 2.2 microns. Not more than 5% by weight of the particles should exceed three microns in size and preferably none should be over five microns.

We have found that a powder having a particle size distribution of substantially all in the range 0.4 to 2.6 microns may be sintered to give artefacts of approximately 99% of the theoretical density.

Beryllia powder may be obtained from beryllium hydroxides and beryllium sulphates by calcination at temperatures above 800° C., but it is presently preferred to calcine at about 1250° C. and then to mill the calcined powder to the requisite particle size.

Conveniently the calcined powder is wet milled in a ball mill with steel balls. In a series of experiments a milling time of 76–100 hours was found to give the optimum results in obtaining the beryllia matrix, and we found that the sintered density of the matrix was improved up to a milling time of 76 hours, and that with a milling time in excess of 100 hours, slip casting was difficult, since the cast became impermeable to water after the formation of an initial layer of thickness approximately 0.01 inch, and thus it was difficult to build up a satisfactory wall thickness for removal of the cast from the mould. It should be appreciated such milling times may only be the optimum under the particular conditions used and indeed, we have found that under different conditions, a milling time of only 48 hours is satisfactory.

After calcination and milling the powder is preferably leached with acid to remove any iron contamination picked up from the steel balls.

It will be appreciated that to determine whether the desired particle size distribution has been attained is a laborious task requiring specialised equipment. We have found it convenient to ascertain whether or not the require particle size distribution has been obtained by slip casting a sample of the milled powder. A suitable powder is characterised by the formation of a green cast having a high gloss finish and we have found that with all the beryllia powders that we have studied, those giving a high gloss green cast have the required particle size distribution.

Once a suitable powder has been obtained, it may be formed into the can and matrix using the known techniques as indicated and a temperature of 1750–1800° C. is preferably used for sintering. For sintering we have used as sintering atmosphere, a mixture of hydrogen and nitrogen.

Brief description of the drawings

In order that the present invention may more readily be understood, an embodiment of the same will now be described with reference to the accompanying drawings, wherein.

Figure 1:
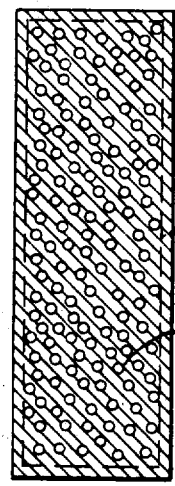
FIG. 1 is a diagrammatic section through a fuel element.
Figure 2:
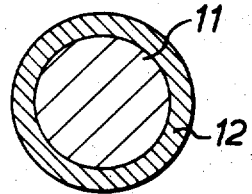
FIG. 2 is a section through a fuel particle.

Referring now to the FIGS. 1 and 2 of the drawings in particular, it will be seen that the fuel element comprises a right circular cylinder having an un-fuelled outer skin 9 which in the case of a cylinder 4.5 cm. long and 1.5 cm. in diameter, is conveniently 1 mm. thick. Within this skin 9 is a dispersion 8 of fuel particles in a matrix of beryllia and, as indicated by the dotted line 10, the matrix extends through the entire body, forming the outer skin.

As can be seen from FIG. 2, each fuel particle comprises a sphere of uranium dioxide 11, approximately 250 microns in diameter and this sphere is enclosed within a coating 12 of beryllia which can be up to 40 microns thick. As explained in detail hereinafter, the coating 12 on core 11 is desirably of considerably less than theoretical density and indeed may be relatively porous. On the other hand the beryllia of the matrix and skin is as dense as can conveniently be made and is preferably better than 99% dense.

The preparation of the coating and the matrix will now be described in detail.

Description of the preferred embodiment

Beryllia powder was sieved to give agglomerates of less than 300 mesh BSS (53 microns) and 5% by weight of polyethylene glycol wax dissolved in methylated spirits was then added to the powder. They methylated spirits was allowed to evaporate giving a dry waxed beryllia powder. This waxed beryllia powder was then added to spheres of presintered uranium dioxide of diameter 150–250 microns, which were contained within a brass drum which was revolving with its axis horizontal at a rate sufficient to give a surface speed of 100 feet per minute. These spheres had first been washed in methylated spirits to remove loose surface powder. After a period of mixing the spheres with the waxed powder, the spheres became uniformly coated with the beryllia and further additions of waxed beryllia powder were made until sufficient beryllia had been added to give a beryllia coating of 5 to 40 microns. These spheres were placed in a vacuum furnace and dewaxed by heating at 300° C. for 12 hours at a pressure of about 10 microns, the wax collecting in a cold upper part of the vacuum apparatus. The de-waxed spheres were placed in a hydrogen-nitrogen atmosphere furnace and the coating pre-sintered by heating at 1300° C. for 4 hours. The sintered coating produced had a density of approximately 30% of the theoretical value.

In order to prepare the casting slip beryllium hydroxide was calcined in a muffle furnace for 12 hours at a temperature of 1250° C., in an atmosphere of air.

A hundred grammes of the calcined powder were loaded into a polythene-lined cylinder of 4 inches internal diameter and 7 inches in length, together with 300 ccs. of distilled water and 1800.0 grammes of ⅜ inch diameter steel balls. The cylinder was then rotated to give a surface speed of 180 feet per minute and milling was continued for 76 hours.

The milled powder was then leached three times in 6 N hydrochloric acid, washed once in distilled water and the acidity of the slip, which consisted of a suspension of the milled powder in water, was then adjusted to pH 1.0 by allowing the powder to settle, siphoning off the supernatant liquid and adding more distilled water. The specific gravity of the slip was usually adjusted to be in the range 1.7 to 2.2 depending on the nature of the artefact to be cast and the state of the mould.

Figure 3:
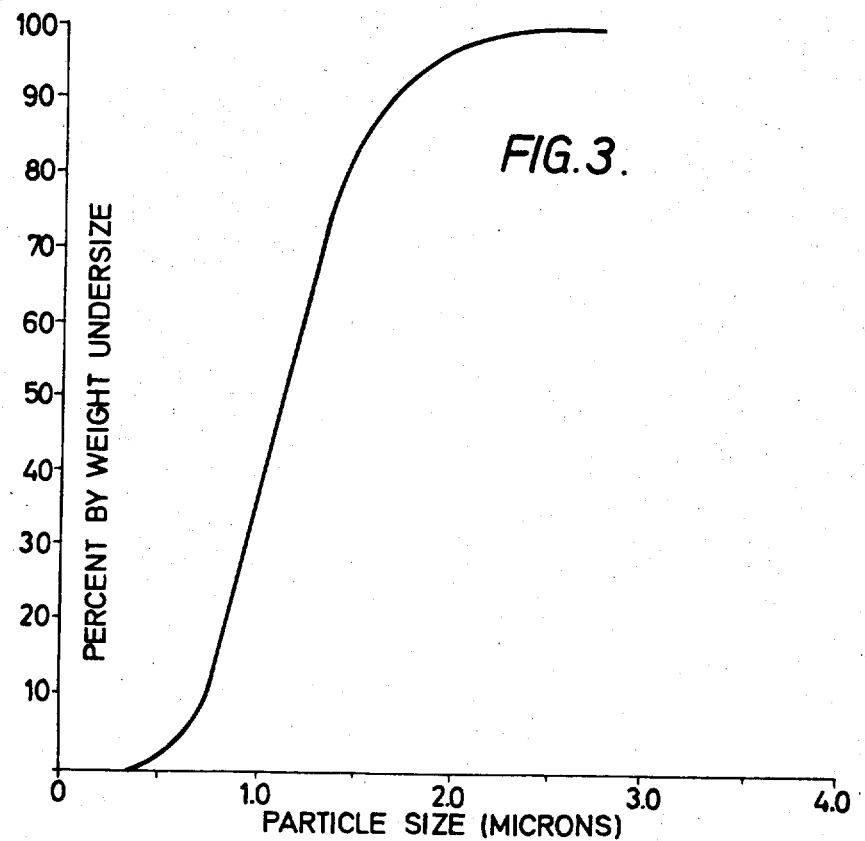
FIG. 3 is a graph showing the particles sizes of the powder used for slip casting.

The slip was characterised by particle size analysis using a centrifugal photo-sedimentometer, the results of which are shown in FIGURE 3 which is a graph showing the percentage by weight of the powder which is under-size for a given particle size (in microns). It will be observed that the material has a small particle size and a small size distribution range of 0.4 to 2.6 microns.

The chemical analysis of the casting slip (C.S.) is given in the table and for comparative purposes the analysis of a beryllia powder prepared by calcination at 1000° C. of the beryllium hydroxide used in preparing the casting slip is also given.

TABLE

| Powder | Impurity content (p.p.m.) | | | | | | | | | | | | | | | |
|---|---|---|---|---|---|---|---|---|---|---|---|---|---|---|---|---|
| | Li | Na | K | Mg | Fe | Al | Ca | Si | B | S | Mn | Zn | P | F | CR | As |
| C.S. | 5 |  | <5 | 20 | 600 | 7 | <10 | 100 | 2 |  | 7 | 20 |  |  | 50 | 40 |
| 1,000° C. | 98 | 1,800 | <10 | 350 | 70 | 15 | <250 | 900 | 0.2 | <3 | 15 | 10 |  | <700 |  |  |

It will be observed that the casting slip has a greater purity than the 1000° C. calcined material, the only additional impurity present in the slip being iron, introduced during the milling of the powder.

Wet-milling of the 1000° C. calcined material under the same conditions and then slip casting showed this material to be unsatisfactory due to high shrinkage in the green state resulting in cracking or splitting of cast crucibles. It is though that this material contained a large proportion of fine powder and that this caused the high shrinkage.

The casting slip prepared as described above was cast into plaster of Paris moulds to give cans 4.5 cms. in length x 1.5 cms. diameter x 1 mm. wall thickness.

The can was allowed to dry out in the mould for a maximum of five minutes before commencing to fill it with the beryllia coated fuel spheres. In the first stage, approximately ¼ inch of beryllia slip was poured into the can and then coated spheres were added until the slip had been taken up. This procedure was repeated until the can was filled to approximately ⅛ inch from the top, this space being filled with the slip to give a top to the can.

The completed can was allowed to dry in situ in the mould for approximately 12 hours and was then removed from the mould, dried for 2 days in air at room temperature, and then placed in a molybdenum boat which was placed on a beryllia block base in a molybdenum wound alumina tube resistance furnace. An atmosphere comprising a mixture of nitrogen and hydrogen in the molecular proportions 70/30 was established within the furnace which was then raised to a sintering temperature of 1750° C. or 1800° C. at a rate of 400° C. per hour.

In order to test oxidation resistance, specimens were heated in air at 750° C. for 336 hours and at 1000° C. for 400 hours. No weight changes were observed.

The technique may be used to make fuel elements having a fuel loading of 5 to 15 percent by volume $UO_2$.

I claim:

1. A fuel element for a nuclear reactor comprising a plurality of particles of ceramic fuel material each of said particles being coated with a layer of beryllia of less than 50% theoretical density, said coated particles being contained within a sintered body of beryllia of density at least 90% theoretical density which forms a continuous matrix between said coated particles and which also forms an outer layer of the fuel element, said outer layer being depleted of nuclear fuel.

2. A fuel element according to claim 1 wherein the fuel particles are spheres of diameter 150–250 microns.

3. A fuel element according to claim 1 wherein the thickness of the beryllia layer coating the particles is 5 to 40 microns.

4. A fuel element according to claim 1 wherein the unfuelled outer layer is approximately 1 mm. thick.

5. A fuel element for a nuclear reactor comprising a plurality of particles of an oxide of a nuclear fuel metal, each of said particles being coated with a layer of beryllia of less than 50% theoretical density, said coated particles being contained within a sintered body of beryllia of density at least 98% theoretical density which forms a continuous matrix between said coated particles and also surrounded them to form an outer layer to the fuel element, said outer layer containing no fuel particles.

No references cited.

CARL D. QUARFORTH, *Primary Examiner.*

MELVIN J. SCOLNICK, *Assistant Examiner.*

U.S. Cl. X.R.

176—71, 91; 252—301.1